(12) United States Patent
Delprat et al.

(10) Patent No.: US 6,962,165 B2
(45) Date of Patent: Nov. 8, 2005

(54) AUTOMATICALLY-ACTUATED SAFETY DEVICE WITH A DOUBLE-SEATED VALVE TO REGULATE THE FLOW RATE OF A FLUID

(75) Inventors: Cyrille Delprat, Paris (FR); David Leme, Alfortville (FR); Lahouari Bouajaj, Châtillon (FR); Sylvain Pineau, Montgeron (FR)

(73) Assignee: Gaz de France, Saint-Denis la Plaine Cédex (FR)

( * ) Notice: Subject to any disclaimer, the term of this patent is extended or adjusted under 35 U.S.C. 154(b) by 252 days.

(21) Appl. No.: 10/637,992

(22) Filed: Aug. 8, 2003

(65) Prior Publication Data
US 2004/0103943 A1    Jun. 3, 2004

(30) Foreign Application Priority Data
Aug. 9, 2002 (FR) .................................. 02 10172

(51) Int. Cl.[7] ............................................. F16K 17/34
(52) U.S. Cl. .............. 137/498; 137/601.13; 137/601.2; 137/843
(58) Field of Search ................................ 137/497, 498, 137/517, 843, 854, 853, 860, 601.13, 601.2

(56) References Cited

U.S. PATENT DOCUMENTS

| | | | |
|---|---|---|---|
| 2,583,384 A | * | 1/1952 | Mercier ...................... 137/498 |
| 2,802,486 A | * | 8/1957 | Frey ........................... 137/843 |
| 2,926,690 A | | 3/1960 | Martin |
| 3,703,913 A | * | 11/1972 | Carsten .................. 137/601.2 |
| 4,856,552 A | * | 8/1989 | Hiemstra .................... 137/497 |
| 5,293,898 A | | 3/1994 | Masloff |
| 5,697,351 A | | 12/1997 | Schumacher |
| 6,062,264 A | | 5/2000 | Dickson |
| 6,443,180 B1 | * | 9/2002 | Samuelson et al. ......... 137/460 |

FOREIGN PATENT DOCUMENTS

| | | |
|---|---|---|
| EP | 1 059 481 | 12/2000 |
| JP | 2002 156061 | 9/2002 |

* cited by examiner

Primary Examiner—Stephen M. Hepperle
(74) Attorney, Agent, or Firm—Collard & Roe, P.C.

(57) ABSTRACT

A safety device for insertion into a pipeline (K) in which fluid circulates in an upstream (X–) and a downstream (X+) direction, comprises a tube (1) that provides the fluid with a central circulatory passage (CC) regulated by a central valve (3) that closes in the event of an excessive flow of this fluid. There is an annular valve closure member (4) which is elastically malleable, mounted to the external periphery of the tube (1), and provides the fluid with a peripheral circulatory passage which it selectively obstructs by subjecting a radial expansion in the event of an excessive flow of fluid.

14 Claims, 2 Drawing Sheets

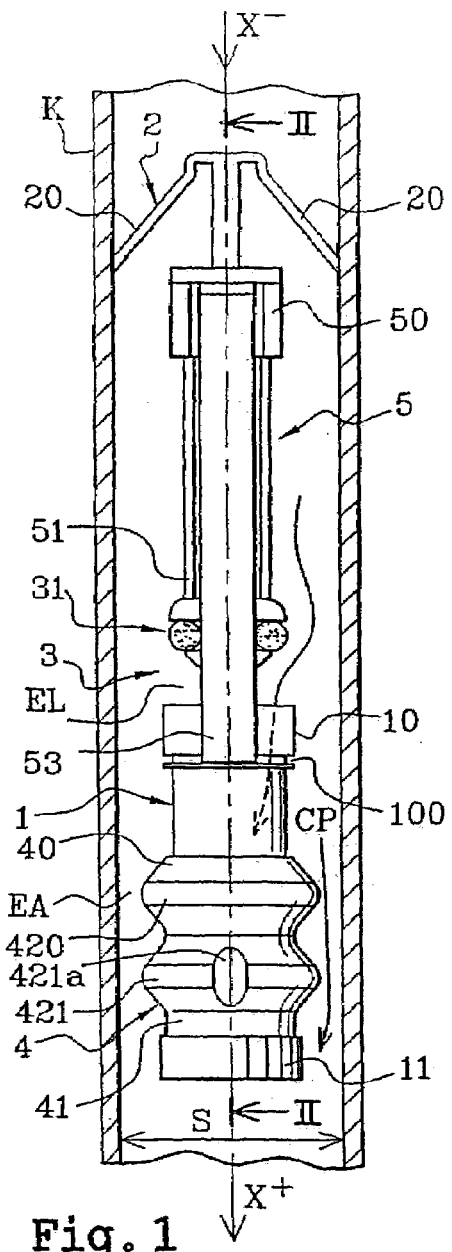
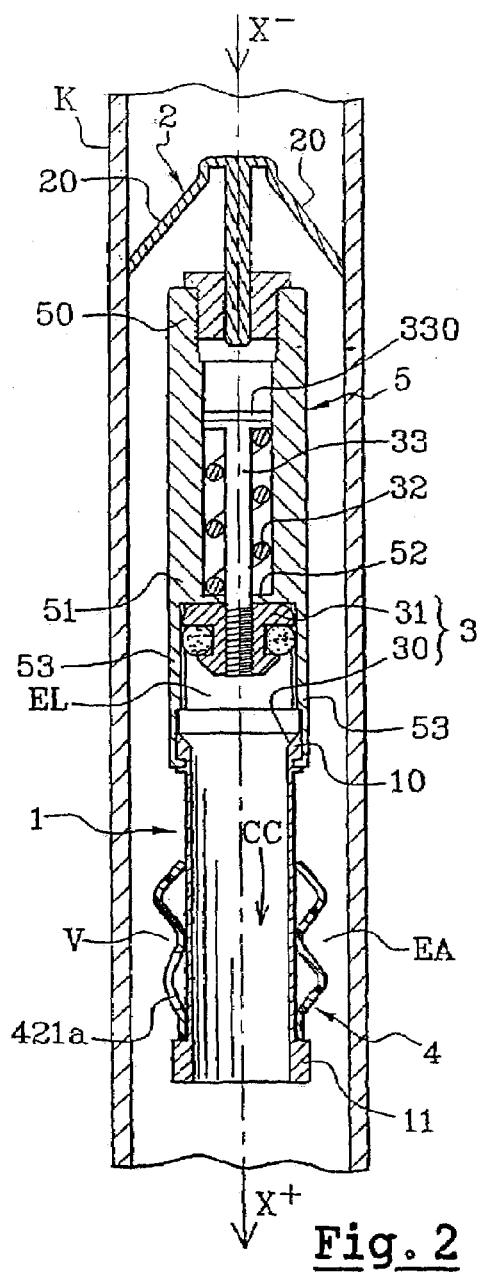
Fig. 1  Fig. 2
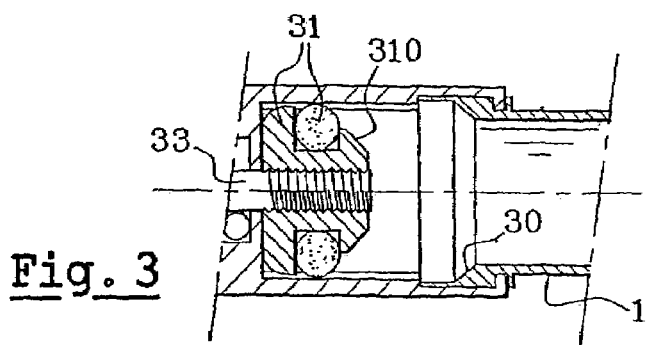
Fig. 3

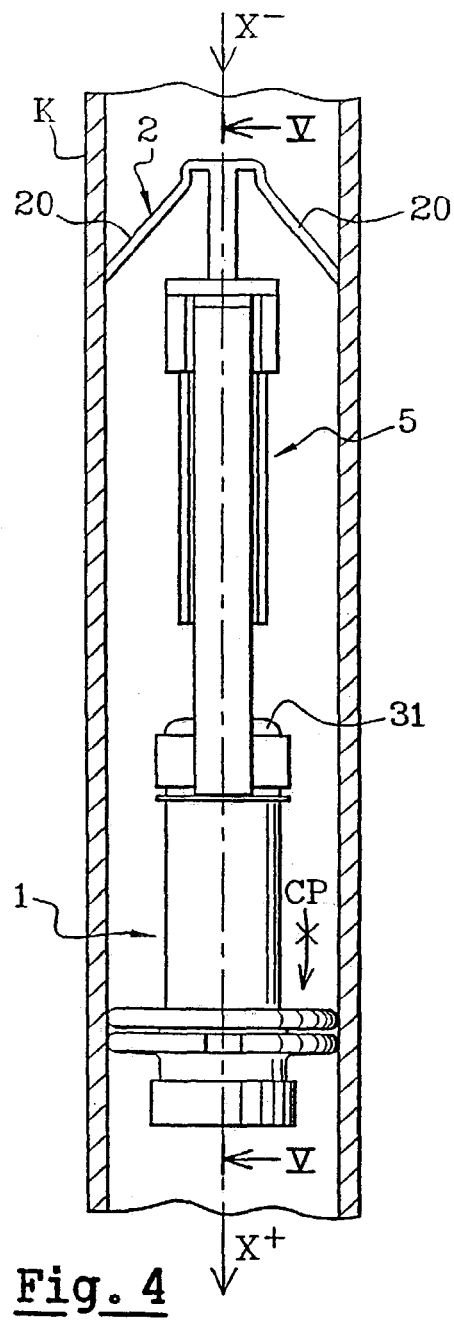
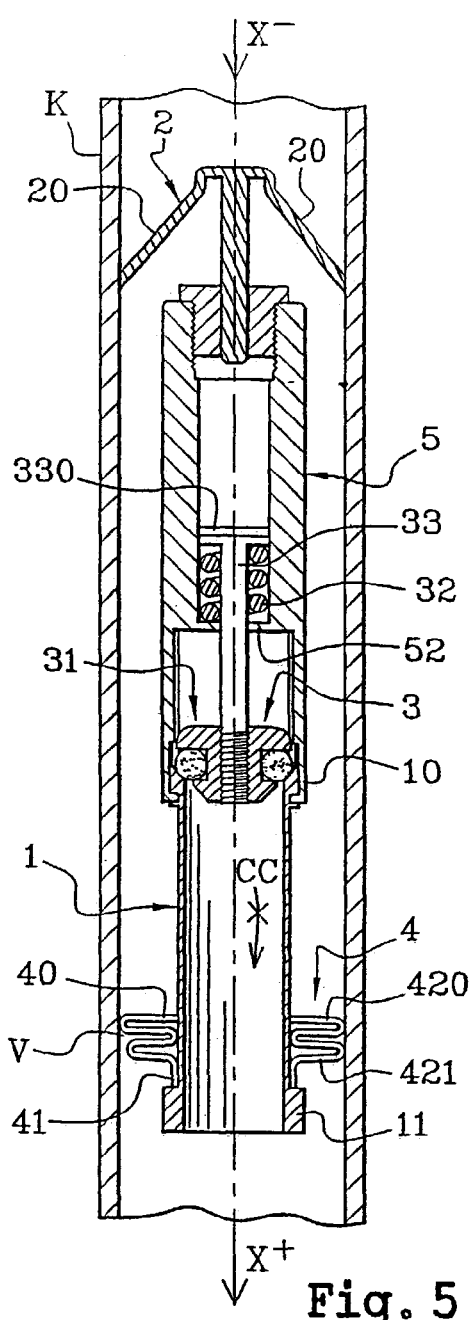
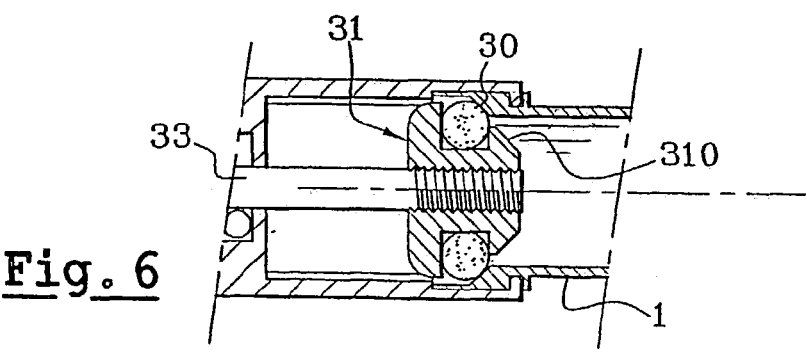
Fig. 4
Fig. 5
Fig. 6

AUTOMATICALLY-ACTUATED SAFETY DEVICE WITH A DOUBLE-SEATED VALVE TO REGULATE THE FLOW RATE OF A FLUID

BACKGROUND OF THE INVENTION

1. Field of the Invention

This invention relates to automatically-actuated safety valves used in gas mains. More precisely, the invention relates to a safety device inserted into a fluid pipeline of a set minimal sectional area to protect it against excessive flow rates of fluid circulating in it from upstream to downstream. The device comprises a tube with open upstream and downstream ends and a central circulatory passage for the fluid, retention means to hold the tube in place within the pipeline, and means of regulating the fluid circulation including a central valve. The device changes between a rest configuration, which it adopts in the event of a normal fluid flow rate and in which the central valve frees the central circulatory passage, and a safety configuration, which it adopts in the event of an excessive fluid flow rate and in which the central valve obstructs the central circulatory passage. The central valve itself includes a valve seat embedded in the tube, a central valve closure member selectively applied to the valve seat, and a spring exerting an elastic opening force on the central valve closure member. This force solicits the central valve closure member at a distance from the valve seat, counter to a closure force exerted on this central valve closure member by loss of head which increases with the flow rate of the fluid in the pipeline.

2. The Prior Art

Devices meeting this definition by extension are known in the prior art, as demonstrated, for example, in U.S. Pat. No. 2,926,690 and U.S. Pat. No. 5,293,898. Some fluid pipelines require special safety measures, imposed by the nature of the fluid to he transported and by any possible risk of damage to the pipes which constitute these pipelines.

For example, the gas mains in urban areas generally lie under roads and pavements, that being under public land structures likely to undergo various works, notably earthworks. And, if a gas pipe is accidentally pulled up or severed during such works, the immediately resulting gas leak creates a very high risk of fire or explosion. In this context, safety valves have been developed to obstruct the gas pipes as soon as an abnormally high gas flow rate is detected.

The current security valves can only be mounted onto new pipelines being laid, or possibly to extant pipelines, but only when they are being renovated. Indeed, as extant pipelines may have been laid at different periods and according to different standards, meaning that they do not necessarily have very precisely defined diameters, and have obstacles, flashes, buckles restrictions, and/or bend radiuses along their run, and the implementation of a safety valve demands perfect adjustment of the valve body to the pipe, the inserting of safety valves into extant pipelines requires intervention at the exact point of insertion, this intervention involving an excavation giving access to the chosen point on the pipeline, a shutting off of the fluid supply downstream, and a local adaptation of the pipeline to the valve, at the insertion point.

Thus, although it is known to insert into a pipeline under pressure, notably for detection purposes, devices of limited size via a point of access-without having to carry out major work on the pipeline, this technique, similar to catheterism for medical exploration, is to date very difficult to use for the laying of safety valves.

Additionally, a safety valve, is known in European Patent No. EP 1 059 481, which does not comprise a tube and therefore does not belong to the previously described model, but comprises a chamber which expands in the event of an excessive fluid flow rate in the pipeline and allows a jacket on the outside of the chamber to bulge and form a valve.

Although this valve can be inserted into an extant pipeline and therefore meets the previously described requirements, its functioning rests on technical compromises difficult to conciliate with long run work.

The present invention, that falls within this context, therefore aims at proposing a safety device likely to be implemented, without excavation work, into a pipeline by inserting it as near as possible to an attachment plug of this pipeline, and having a reliable behavior without requiring the use of materials whose physical properties would be at the limit of the known technical possibilities.

SUMMARY OF THE INVENTION

To this end, the device of the invention, which also includes means of regulating the circulation of fluid further comprising an annular valve closure member which is elastically malleable, mounted to the external periphery of the tube, and separated radially from the pipeline, in the rest configuration of the device, by an annulus providing the fluid with a peripheral circulatory passage. The annular valve closure member is subject to, in the event of excessive flow rate of the fluid, a radial expansion by which it is pressed against the pipeline and obstructs the peripheral circulatory passage.

In the preferred embodiment of the invention, the valve seat is supported by the downstream end of the tube. The central valve closure member is advantageously integral to a valve rod on which the spring acts, thus allowing this central valve closure member, the valve rod and the spring to be easily placed upstream from the tube.

For example, the safety device of the invention comprises a hollow body placed in line with the tube upstream from the latter, in which the valve rod and the spring are housed, and which has a downstream end in relation to which the central valve closure member slides, the hollow body and the tube being longitudinally separated one from the other by a longitudinal space providing the fluid with a passage regulated by the central valve and linking the exterior of the hollow body to the interior of the tube.

In this case, the spring can be interposed between an internal abutment of the hollow body and an abutment on the valve rod, this spring working under compression. The loss of head of the fluid circulating in the pipeline can be reduced by planning that the central valve closure member has a point turned towards the valve seat. The annular valve closure member, which is preferably closer to the downstream end of the tube than to the upstream end, has for example a fixed downstream end in relation to the tube, and an upstream end, selectively movable along the tube in the event of an excessive fluid flow rate, the downstream movement of the upstream end of the annular valves closure member provoking a radial widening of this annular valve closure member.

This annular valve closure member, advantageously made in an elastomer material, can in addition he shaped as a bellows seal that bears at least one radial bulge. In the preferred embodiment of the invention, the annular valve closure member is shaped as a bellows seal bearing an upstream radial bulge and a downstream radial bulge, the downstream radial bulge having at least one air flow path, for example provided via an axial groove, allowing the downstream evacuation of the fluid present in the volume delimited by the radial bulges.

Additionally, it can be judicious to ensure that, when the device changes from its rest configuration to its safety configuration, the central valve closure member applies in a reversible manner to the valve seat whereas the annular valve closure member applies in an irreversible manner to the pipeline.

In an easy to apply embodiment, the retention means comprise multiple claws fixed to the upstream end of the hollow body and solicited by an elastic force towards a radial. deployment configuration equivalent to that of the spokes of an open umbrella.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 is a lateral view of a device in accordance with the invention, represented in its rest configuration inside a pipeline represented on a cross-section view;

FIG. 2 is a longitudinal cross-section view of the device represented in FIG. 1, seen according to the sectional view indicated by the arrows II—II in FIG. 1;

FIG. 3 is an enlarged reproduction of a detail of FIG. 2;

FIG. 4 is a similar view to that of FIG. 1, however in which the device is represented in its safety configuration;

FIG. 5 is a longitudinal cross-section view of the device represented in FIG. 4, seen according to the sectional view indicated by the arrows V—V in FIG. 4; and FIG. 6 is an enlarged reproduction of a detail of FIG. 5.

DETAILED DESCRIPTION OF THE PREFERRED EMBODIMENT

Referring now in detail to the drawings, the invention relates to a safety device designed to be inserted into a fluid pipeline K of a set minimal sectional area S, and more specifically into a gas pipeline in the preferred application of the invention, to protect this pipeline against an excessive flow rate of the fluid, and more specifically of the gas, which circulates from an upstream region X+ towards a downstream region X+.

In a known manner, this device essentially comprises a tube 1, retention means 2 to hold tube 1 in place in pipeline K, and means of regulating fluid circulation including a central valve 3. Tube 1 is open at its upstream 10 and downstream 11 ends, and thus spontaneously provides the fluid with a central circulatory passage CC (FIG. 2), regulated by the central valve 3.

In these conditions, the invention can change between a rest configuration which it adopts in the event of a normal fluid flow rate and in which central valve 3 frees the central circulatory passage CC, and a safety configuration which it adopts in the event of an excessive fluid flow rate and in which the central valve 3 obstructs central circulatory passage CC.

Central valve 3 is essentially comprised of a valve seat 30 embedded in tube 1, a central valve closure member 31 that applies to valve seat 30 in the safety configuration, and a spring 32.

Spring 32 acts on the central valve closure member 31 an opening elastic force which solicits this valve closure member at a distance from valve seat 30, counter to a closure force exerted to central valve closure member 31 by a loss of head subjected, between the regions directly upstream and downstream of the central valve closure member, to the fluid circulating in the pipeline K. As long as the fluid flow rate in this pipeline as normal, the closure force is defeated by the force exerted by spring 32, so that central valve closure member 31 is kept at a distance from valve seat 30.

On the other hand, as soon as the fluid flow rate in pipeline K becomes excessive, the force exerted by spring 32 is defeated by the closure force exerted by the loss of head, which increases with the flow rate, so that central valve closure member 31 is applied to valve seat 30.

Those skilled in the art will easily understand at least upon reading the above, that the maximum value of flow rate above which this flow rate is considered to be excessive can be adjusted by regulating the valve loading of the spring 32.

In the device of the invention, the means of regulating the fluid circulation comprise, in addition to central valve 3, an annular valve closure member 4 which is elastically malleable, and which is mounted onto the external periphery of the tube 1.

In the rest configuration of the device, the annular valve closure member 4 is radially separated from pipeline K by an annulus EA (FIG. 1) which provides the fluid with a peripheral circulatory passage CP. However, as soon as the fluid flow rate in the pipeline K becomes excessive, the annular valve closure member is subject to, due to the important loss of head of the flowing fluid, a radial expansion by which annular valve closure member 4 is pressed against pipeline K and obstructs the peripheral circulatory passage CP (FIGS. 4 and 5).

In addition to this principal characteristic, the safety device of the invention comprises other characteristics which significantly strengthen the advantages provided by this principal characteristic.

In particular, central valve closure member 31 is fixed to the downstream end of a valve rod 33 on which spring 32 acts, and central valve closure member 31, as well valve rod 33 and spring 32, are placed upstream of tube 1 instead of being inserted into the tube as is the case for the devices described in U.S. Pat. Nos. 2,926,690 and 5,293,898.

Due to this layout, the loss of head of fluid massing through the tube 1 is reduced and this tube can thus, without any major drawbacks, have a transverse sectional area substantially inferior to the minimum transverse sectional area S of the pipeline K.

Valve rod 33 and spring 32 can be housed and guided in a hollow body 5 which is placed upstream 25 of tube 1, in line with it.

For example, spring 32 is interposed between an internal abutment 52 of hollow body 5 and an abutment 330 on valve rod 33, this spring 32 working under compression, and central valve closure member 31 sliding in relation to downstream end 51 of the hollow body 5.

So as to be fixed to tube 1, hollow body 3 can have, for example at its downstream end 51, flexible lugs 53 elastically interlocking in an external peripheral groove 100 of tube 1.

Those skilled in the art will easily understand that the profile of hollow body 5 can be aerodynamically optimized and can notably resemble the profile of a nose of an airplane, so as to limit the disturbances to the fluid flow and thus reduce the loss of head of the device.

The retention means 2 preferably consist of multiple claws 20 which are fixed to the upstream end 50 of hollow body 5 and which are solicited by an elastic force towards a radial deployment configuration similar to that adopted by the spokes of an open umbrella.

As is shown in FIG. 1, hollow body 5 and tube 1 are longitudinally separated from one another by a longitudinal space EL which provides the fluid circulating in the pipeline K with a passage which is regulated by central valve 3 and which links the exterior of hollow body 5 to the interior of tube 1.

Valve seat 30 is advantageously supported by upstream end 10 of tube 1, and central valve closure member 31 can have a point 310 turned towards valve seat 30 so as to reduce the loss of head of the fluid flowing in central circulatory passage CC.

The annular valve closure member 4, which is preferably made of elastomer material, is placed closer to downstream end 11 of tube 1 than to upstream end 10 of tube 1.

The downstream end 41 of annular valve closure member 4 is fixed in relation to tube 1, and abuts for example on a terminal collar of tube 1.

Upstream end 40 of this annular valve closure member 4, which is advantageously shaped as a bellows seal, moves along tube 1 towards the downstream X+ in the event of an excessive fluid flow rate, this valve closure member 4 being subject to, due to this movement, a radial widening due to which it presses against the internal periphery of pipeline K (FIGS. 4 and 5).

As FIGS. 1, 2, 4 and 5 demonstrate, annular valve closure member 4 preferably has an upstream radial bulge 420 and a downstream radial bulge 421.

Experiences have demonstrated that the obstructing of pipeline K via upstream radial bulge 420 can be reinforced by planning for, on downstream radial bulge 421, one or several air paths, for example formed by just as many axial grooves 421a, and allowing the downstream evacuation of the fluid present in the volume V delimited by the radial bulges 420 and 421.

As previously described, central valve closure member 31 applies in a reversible manner to valve seat 30 when the safety device chances from its rest configuration to its safety configuration, this behavior eliminating the need to extract the device from the pipeline K to recommission the pipeline K once it has been repaired.

On the contrary, it can he judicious to ensure that central valve closure member 4 applies in an irreversible manner to pipeline K when the safety device changes from its rest configuration to its safety configuration, and this behavior can be obtained by making the annular valve closure member 4 in a high-adherence and low-rigidity material, thus obtaining an optimal tightness in the safety configuration.

For installing the device in a pipeline K, claws 20 must be folded in a radial manner towards hollow body 5 to allow this device to advance in this pipeline despite the presence of possible diameter restrictions of this pipeline, after which claws 20 are allowed to spontaneously return to their deployed configuration to ensure the pinning of this device in the pipeline.

This installing can be carried out, in a known manner to those skilled in the art and described in the aforementioned European Patent EP 1 059 4B1, by placing the device, in a folded and compressed configuration, at least partly in a bushing held to the end of a flexible circlip, by pushing the circlip into the pipeline until the bushing reaches the chosen point for installing the device, and by evicting the latter from the bushing by any appropriate means.

In consideration of the structure of the annular valve closure member and the material it is made in, the device can be compressed in the bushing until it has a greatly reduced diameter facilitating the passing through the narrow passages of the pipeline, the radial elastic force exerted by the bushing thus constricting the annular valve closure member, being sufficient to guarantee the mechanical cohesion of the unit formed by the bushing and this device.

Accordingly, while only a few embodiments of the present invention have been shown and described, it is obvious that many changes and modifications may be made thereunto without departing from the spirit and scope of the invention.

What is claimed is:

1. Safety device inserted into a fluid pipeline (K) having a set minimal sectional area, said device protecting said pipeline against excessive flow rates of fluid circulating in said pipeline from upstream (X−) to downstream (X+), said device comprising:
   (a) a tube (1) with open upstream and downstream ends (10, 11) and providing a central circulatory passage (CC) for the fluid;
   (b) a retention device (2) to hold the tube (1) in place within the pipeline (K), and
   (c) a fluid circulation regulator comprising:
      (1) a central valve having:
         (i) a valve seat (30) embedded in the tube (1);
         (ii) a central valve closure member (31) selectively applied to the valve seat (30); and
         (iii) a spring (32) exerting on the central valve closure member (31) an elastic opening force which opens the central valve closure member a distance from the valve seat (30), counter to a closure force exerted on the central valve closure member (31) by loss of head which increases with a flow rate of fluid in the pipeline (K),
      (2) an annular valve closure member (4) which is elastically malleable, mounted to an external periphery of the tube (1), and separated radially from the pipeline (K), in a rest configuration of the device, by an annulus (EA) providing the fluid with a peripheral circulatory passage (CP), said annular valve closure member (4) being subject to, in the event of excessive flow rate of the fluid, a radial expansion by which it is pressed against the pipeline (K) and obstructs the peripheral circulatory passage (CP);
   wherein said device changes between the rest configuration, which the device adopts in the event of a normal fluid flow rate and in which the central valve (3) frees the central circulatory passage (CC), and a safety configuration, which the device adopts in the event of an excessive fluid flow rate and in which the central valve (3) obstructs the central circulatory passage (cc).

2. Safety device according to claim 1, wherein the valve seat (30) is supported by the downstream end (10) of the tube (1).

3. Safety device according to claim 1, wherein the central valve closure member (31) is integral to a valve rod (33) on which the spring (32) acts.

4. Safety device according to claim 3, wherein the central valve closure member (31), the valve rod (33) and the spring (32) are placed upstream from the tube (1).

5. Safety device according to claim 4, wherein the device additionally comprises a hollow body (5) placed in line with the tube (1) upstream from the tube, in which the valve rod (33) and the spring (32) are housed, and which has a downstream end (51) in relation to which the central valve closure member, the hollow body (5) and the tube (1) being longitudinally separated one from the other by a longitudinal space (EL) and providing the fluid with a passage regulated by the central valve (3) and linking the exterior of the hollow body (5) to the interior of the tube (1).

6. Safety device according to claim 1, wherein the spring (32) is interposed between an internal abutment (52) of the hollow body (5) and an abutment (330) on the valve rod (33), said spring (32) working under compression.

7. Safety device according to claim 1, wherein the central valve closure member (31) has a point (310) turned towards the valve seat (30).

8. Safety device according to claim 1, wherein the annular valve closure member (4) is closer to the downstream end (11) of the tube (1) than to the upstream end (10).

9. Safety device according to claim 1, wherein the annular valve closure member (4) has a fixed downstream end (41) in relation to the tube (1), and an upstream end (40), selectively movable along the tube (1) in the event fan excessive fluid flow rate, the downstream movement of the upstream end (40) of the annular valve closure member (4) provoking a radial widening of the annular valve closure member (4).

10. Safety device according to claim 1, wherein the annular valve closure member (4) is made of an elastomer material.

11. Safety, device according to claim 1, wherein the annular valve closure member (4) is shaped as a bellows seal that has at least one radial bulge (420).

12. Safety device according to claim 1, wherein the annular valve closure member (4) is shaped as a bellows seal that has at least one radial bulge (420) and a downstream radial bulge (421), the downstream radial bulge (421) having at least one air flow path (421a) allowing the downstream evacuation of fluid present in a volume (V) delimited by the radial bulges (420, 421).

13. Safety device according to claim 1, wherein when the device changes from the rest configuration to the safety configuration, the central valve closure member acts in a reversible manner on the valve seat and the annular valve closure member acts in an irreversible manner on the pipeline (K).

14. Safety device according to claim 5, wherein the retention device comprises multiple claws fixed to the upstream end (50) of the hollow body (5) and moved by an elastic force towards a radial deployment configuration equivalent to spokes of an open umbrella.

* * * * *